S. S. GREENE.
TIRE UPSETTING MACHINE.
No. 28,471.  Patented May 29, 1860.
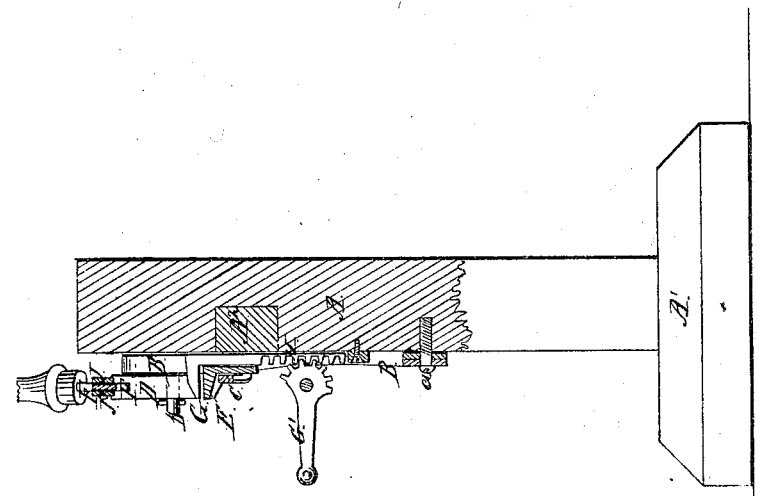
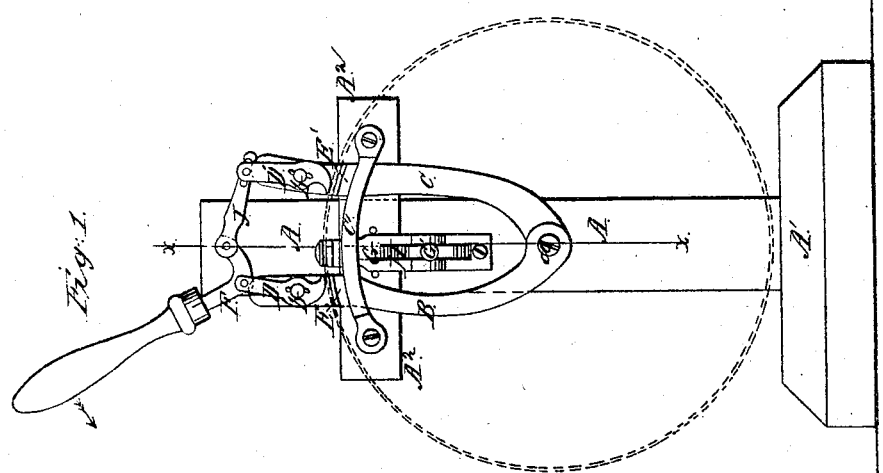
Witnesses:
R. S. Spencer
J. W. Coombs
Inventor:
S. S. Greene,
per Munn & Co.
Attorneys

UNITED STATES PATENT OFFICE.

S. S. GREENE, OF ROME, NEW YORK.

SHRINKING TIRES.

Specification of Letters Patent No. 28,471, dated May 29, 1860.

*To all whom it may concern:*

Be it known that I, S. S. GREENE, of Rome, in the county of Oneida and State of New York, have invented a new and useful Improvement in Machines for Shrinking Tires; and I do hereby declare that the following is a full, clear, and exact description thereof, reference being had to the accompanying drawings, forming a part of this specification, in which—

Figure 1 represents a front view of the machine showing a tire in red lines undergoing the operation of shrinking. Fig. 2 is a vertical transverse section taken through the red line $x$, $x$, indicated on Fig. 1.

Similar letters of reference indicate corresponding parts in both figures.

To enable those skilled in the art to fully understand my invention I will proceed to describe its construction and operation.

In the drawings, A represents a strong upright post supported on a base piece $A'$, and carrying near its top a cross piece $A^2$, which is firmly bolted to it. This frame carries on its side two upright curved arms B, C, one (C) of which is securely pivoted at $a$, to the post A, so as to be capable of vibrating, and the other (B) is fixed rigidly to the frame. These arms pass up through a curved guide bar $C'$, which keeps them against the frame; and near the tops of both arms B, C, project out strong pins $b$, $b$, which receive the gripping jaws D, $D'$. Below the jaws and projecting from the arms B, C, are strong brackets or tables E, $E'$, which are arranged sufficiently near the pins $b$, $b$, to allow the ends of the jaws D, $D'$, to touch their tops when the jaws are placed in a vertical position.

The lower gripping ends of the jaws D, $D'$, are curved down to their edges so that the tire, which is placed over the surfaces of tables E, $E'$, will be held by the "bite" of these edges, closely down on the tables.

J is a jointed connecting rod one end of which is pivoted to the end of jaw C, while the other is pivoted to the end of a knee lever F, which lever is again pivoted, at its angle, to the end of jaw D, as represented in Fig. 1. This connecting rod is provided in its end with several reserve holes which will allow the end of $D'$, to be set at different distances from the end of the lever F.

G represents a suitable vise which is interposed between the movable and fixed arms B, C, the jaws of which are suitably arranged with relation to the shrinking devices on the arms B, C, so that the tire may be clamped and held securely between the two shrinking jaws independently of these jaws the object of which is to prevent the tire, at the point where the shrinking takes place, from bending up or down when the contraction takes place. This vise or clamp G, is controlled by the hand acting on a lever $G'$, which by means of teeth on its end acts on the movable rack rod H, so as to raise or depress this rod.

The handle connecting with the knee lever F, may be as long as circumstances require, but on account of the combined lever arrangement of the shrinking device a great power may be exerted with a comparative short handle.

The tire is upset or contracted with this machine as follows: The tire is heated to a proper degree, at any desirable point, and the heated portion is placed on the brackets E, $E'$, when the arm C, is thrown back, as represented by Fig. 1. The tire is then clamped hard down by the vise arrangement G, and held in this state. The handle of lever F, is then brought slowly down until the jaws D, $D'$, clamp the tire firmly to both arms B, C. The tire being thus held to the levers B, C, and at an intermediate point between them as represented by Fig. 1, the handle of lever F, is brought slowly down in the direction of the arrow Fig. 1, when the jaws D, $D'$, will be made to grip the tire still more firmly, at the same time the end of arm C, will be drawn forward toward the opposite arm B, the jaws holding the tire more and more firmly as the pressure is increased.

Having thus described my invention what I claim as new, and desire to secure by Letters Patent, is—

The arrangement as herein shown and described of the jointed arms B, C, jaws D, $D'$, rod J, lever F, and vise G, for the purpose set forth.

S. S. GREENE.

Witnesses:
 WESLEY BRAINERD,
 GEORGE BARNARD,
 S. R. KINNEY.